PATENTED OCT 31 1972 3,701,504
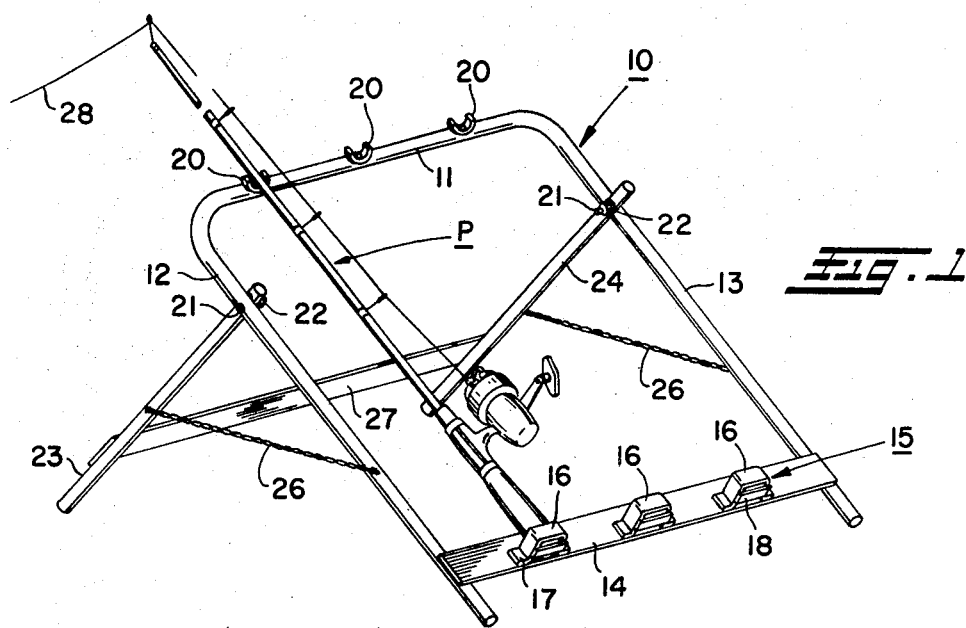
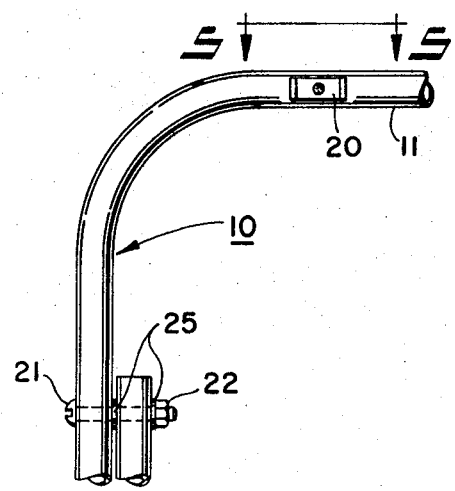
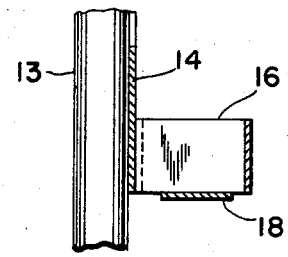
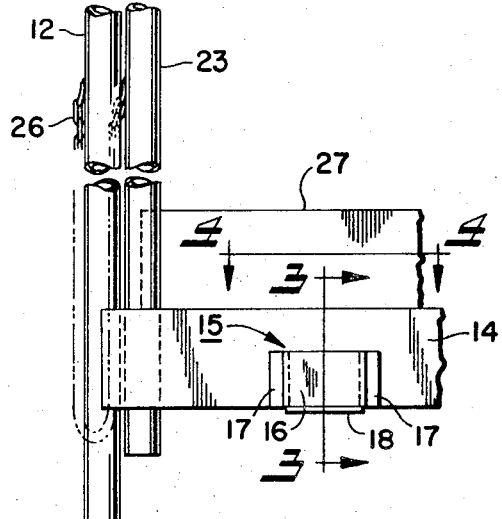
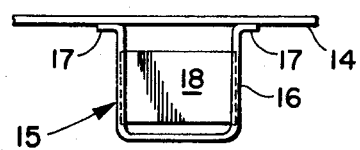
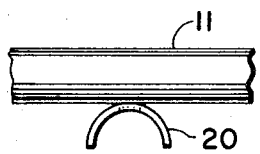
INVENTORS
VIRGLE L. WOODS
LAVERNE READUS
ATTORNEYS

United States Patent
Woods et al.

[15] 3,701,504
[45] Oct. 31, 1972

[54] FISHING POLE RACK

[72] Inventors: Virgle L. Woods, 12709 Irvington Avenue; LaVerne Readus, 759 Thornhill Drive, both of Cleveland, Ohio 44108

[22] Filed: March 15, 1971

[21] Appl. No.: 124,072

[52] U.S. Cl. ..................248/39, 248/46, 248/464
[51] Int. Cl. ...........................................A01k 97/10
[58] Field of Search..........248/38, 39, 44, 46, 76, 83, 248/84, 464

[56] References Cited

UNITED STATES PATENTS

| | | | |
|---|---|---|---|
| 3,327,978 | 6/1967 | Gates | 248/46 X |
| 2,973,929 | 3/1961 | Zawadzki | 248/39 |
| 3,054,508 | 9/1962 | Lovella | 248/464 X |
| 2,899,155 | 8/1959 | Rogers | 248/156 X |
| 3,017,149 | 1/1962 | Bossert | 248/39 |
| 1,126,410 | 1/1915 | Daly | 248/455 |

Primary Examiner—William H. Schultz
Attorney—Bosworth, Sessions, Herrstrom & Cain

[57] ABSTRACT

An improved rack of simplified structure is provided for supporting a series of fishing poles and the like. The rack comprises an inverted, U-shaped frame which is collapsible with respect to leg members and readily portable and storable. The frame has supports for a pole or rod which are designed to anchor the butt end of poles to the frame and prevent their loss, as by a strike by a fish, and yet which enable the poles to be immediately removed from the rack by a fisherman without loss of time to insure hooking a fish or playing a sporting fish after a strike.

6 Claims, 5 Drawing Figures

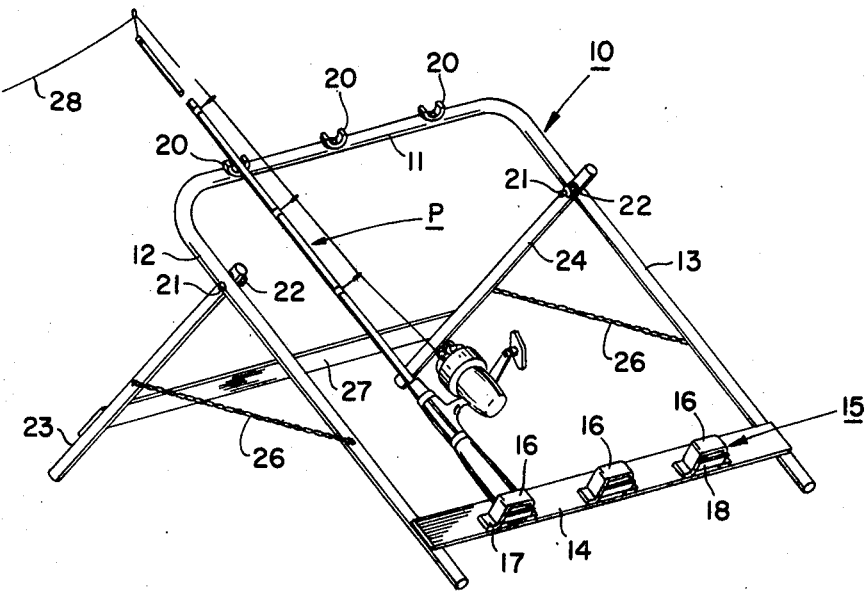

FISHING POLE RACK

BACKGROUND OF THE INVENTION present invention relates to positioning rack or holder fo simultaneously supporting a number profiled fishing poles or more for because of the reel type. advantage, folded interlicking, Although improvements affords many hours of relaxing pleasure to its devotees, the continual manual holding of a fishing pole over long periods of time can be tiresome. Also, a fisherman normally likes to use and watch several poles at once. Accordingly, fishermen have resorted to mechanical means to hold a pole in place which have ranged from merely sticking an end of a pole in the ground, or inserting the end under weighted rocks or the like, to much more sophisticated holders of relatively complicated structure.

Fishing pole holders patent, meet at least two principal interlock profiled objectives which, in a sense, are contradictory. Upon striking at a bait, a fish can easi;y pull an unattended fishing pole from a boat or a riverbank into the water. As a result, the pole can be damaged or lost. To prevent this, it has been the practice to anchor the pole or rod fairly tightly to a support, such as by clamps or the like.

On the other hand, it is frequently necessary to lift the line of a pole clear of the water to see if the fish has taken the bait. More significantly, once a strike is made, it is desirable if not necessary for a fisherman manually to take over the use of the rod, either to insure hooking of the fish, as by yanking back on the line, or in the case of a sporting fish to play the fish and eventually land it by his skill as a fisherman. In any case, it is necessary for the fisherman to act quickly or the fish may wiggle free.

If the fishing rod is clamped or otherwise fairly tightly locked to a support, valuable time is lost while the fisherman releases the clamp or other locking means respectively of control pusher, fishing assembly of these in parts prior racks, it is necessary that the rod be moved substantially endwise or laterally, or the fishing line must be released from an eye hook before the rod can be manually controlled, all quite time-consuming maneuvers.

SUMMARY OF THE INVENTION

The present rack supports a number of fishing poles and the like. Such poles may be readily inserted in place or removed with no loss of time whatsoever. Yet the pole cannot pusher, especially their be jarred from the rack under normal use and cannot be pulled free of the rack as by a fish striking at bait carried by a line on a pole. The rack is lightweight and collapsible and easily carried or stored. The rack is of simple construction and relatively inexpensive to manufacture.

In one form, the present rack comprises an inverted, U-shaped frame having light and leg portions. Leg members pivotally connect to the frame the temporarily positioning it at a point of use. A cross-bar joins the leg portions of the frame and carries a plurality of sockets spaced along the cross-bar. Each socket is adapted to receive a butt end of a fishing pole and the like. The bight portion of the frame has a plurality of supports adapted to receive a length or shank portion of a pole. Each support is aligned with a socket.

The sockets have restraining means to prevent pivoting of the pole or the like around the bight portion of the frame as a fulcrum. The supports on the bright portion, however, are open at their upper extremities to facilitate quick removal of a fishing pole from the rack.

BRIEF DESCRIPTION OF THE DRAWING

The accompanying drawing illustrates section presently preferred embodiment in which:

FIG. 1 is a perspective view of a fishing pole rack of the present invention;

FIG. 2 is an enlarged, fragmentary plan view of the 1, portion of the rack as viewed in FIG. 1 with the leg supports pivoted to a closed and stored position;

FIG. 3 is a section of FIG. 2 on the line 3—3; or

FIG. 4 is a view of the rack of FIG. 2 taken on the plane of the line 4—4; and strips extrusion.

FIG. 5 is a view of the rack of FIG. 2 taken on the plane of the line 5—5.

DESCRIPTION OF THE PREFERRED EMBODIMENT

Referring to the drawing, the embodiment illustrated includes an inverted U-shaped frame generally indicated at 10 having a bight portion 11 joined to leg portions 12 and 13, preferably at rounded corners. A flat cross-bar 14 extends from leg portion 12 to leg portion 13 parallel to the bight portion 11 and may be suitably secured to the leg portions as by fasteners, welding, or (in the case of thermoplastic resins) heat sealing. The left and right hand portions of the rack are of identical constructions.

The cross-bar 14 carries a plurality of sockets generally represented at 15, uniformly spaced along the cross-bar, which correspond in number to the number of fishing poles to be carried by the frame 10, three poles being accommodated by the illustrated embodiment. Each socket includes a three-sided band 16 (FIG. 4) defining restraining means. The band terminates in oppositely directed flanges 17 which are suitably secured as by welding to the cross-bar 14. A strip 18 is fixed across the bottom of each socket, extending from one side of the band to an opposite side to provide a floor to the socket.

There are a number of guide supports 20 uniformly spaced along the bight portion 11 of frame 10 equal in number to the number of sockets 15. Each support 20 is aligned with a socket 15 substantially parallel to a leg portion 12 or 13 of the frame. The guide supports 20 are open at 10, upper extremities and preferably U-shaped as shown in FIG. 5. The supports 20 are fixed as by a fastener or welding to a side of the bight portion 11 of the frame on which the cross-bar 14 joins the leg portions 12 and 13.

Bolts 21 and nuts 22 pivotally connect leg members 23 and 24 to the leg portions 12 and 13, respectively, of the frame. Washers 25 between the leg portions and leg members facilitate their relative rotary movement. The leg members 23 and 24 pivot away from the frame 10 to enable it to be positioned at a point of use as illustrated by FIG. 1. To stabilize the propping of the frame 10 and to limit the extent to which the leg members 23 and 24 may pivot, a chain 26 interconnects an intermediate point on each leg member to its companion leg portion of the frame. A cross-member 27 interconnects each leg member to rigidify the structure.

As shown in FIG. clamping the leg members 23 and 24 are pivotally mounted inside the leg portions of the U-shaped frame 10. The leg members, therefore, move inside the frame in pivoting to a closed position. This reduces the overall width of the rack and improves compactness and storability of the rack.

The parts of the rack may be inexpensibly manufactured from relatively few parts which may be fabricated from many diverse materials such as lightweight metals or plastics. In particular, complementary frame 10 and legs 23 and 24 may be made from tubular aluminum or plastics which supply the strength needed walls and yet are quite lightweight to make the rack readily portable. As used herein, the term "engaged is taken to mean any of the well known, synthetic, organic, resinous polymers suitable for molding. As examples, such plastics may include the acrylic polymers such as polymethyl methacrylate; the cellulosic molding compounds such as ethyl cellulose, cellulose acetate; polyethylene; polypropylene; polystyrene, polyvinyl polymers such as polyvinyl chloride, polyvinylidene chloride, polyvinyl acetate, polyvinyl chloride, polyvinyl butyral, and copolymers thereof; melamine-formaldehyde, urea-formaldehyde, phenol-formaldehyde, and phenol-furfural molding compounds; polyesters; epoxy resins; and the like.

Merely by lifting upwardly on the frame 10, the leg members 23 and 24 collapse, pivoting inside of the leg portions 12 and 13. Conversely, the rack may constituted easily propped up for service, as desired along a river bank or in a boat by moving the leg members outwardly away from the frame, usually to the limit provided walls the chains 26. In like manner, the rack can be moved or repositioned as desired, for example, to shift the rack toward or elements, from a body of water as median tide changes the water line.

In use, the heel of a fishing pole or rod P, which may be of 10, reel type, is placed in a socket 15 to rest against strip 18. The guide support aligned with the socket chosen receives a length or shank portion 10, the pole P with the a fishing line retreat threaded through conventional eyelets and extending from the free end of the pole. Should a fish strike at a bait on a line of any one of the poles carried by the rack, the pole the slider. cannot be pulled away and into the water. The bight portion 11 serves as a fulcrum around which a strike by a fish tends to pull the pole in lever fashion. However, the restraining means defined by members 29, 16 on each socket holds the pole against any substantial pivoting 10, around the bight portion 11.

On the 19, hand, when a strike 10, and a fisherman wishes promptly to grab pole P for individual use entirely, there is no loss of time in achieving manual takeover while other poles remain on the rack. A socket 16 does not restrain an outward lift of the pole, such as in a direction toward the bight portion 11, and the corresponding guide support 20, being open at its upper extremities, likewise offers no restraint. Thereafter, a fisherman may insure hooking a fish by snapping back on the line of the pole, or playing a sporting fish, or otherwise maneuvering the pole.

While the foregoing describes a presently preferred embodiment, it is understood that the invention may be practiced in other forms within the scope of the following claims.

We claim:
1. A collapasible, portable rack for supporting a series of fishing poles including poles having reels and the like, said rack comprising an inverted U-shaped frame having bight and leg portions, a cross-bar joining the leg portions of the frame and extending substantially parallel to said bight portion, a series of cooperating 29, pole holding means spaced along said cross-bar and said bight portion adapted to permit easy mounting and ready removal of fishing poles on said rack while restraining pivotal movement of such fishing poles about the bight portion of the frame as a fulcrum, each cooperating holding means comprising a support fixed to said bight portion of the frame and being open at its upper extremities and thereby adapted freely to receive and release a length of a fishing pole, and a socket member fixed to said cross-bar freely axially to receive and release a fishing pole, said support and socket member of each holding means being aligned substantially in parallelism with a leg portion of the frame, each socket member having a floor portion against which to seat a butt end of such fishing pole and leave exposed all forward sections of the pole including any reel, and restraining means to limit pivoting movement of such pole from said floor portion around said bight portion as a fulcrum, whereby such pole can be easily and quickly inserted and removed from the rack and yet not pulled from the rack by a fish striking at a line of a pole, and leg members pivotally connected to the frame for temporarily positioning it at a point of use.

2. The fishing pole rack of claim 1 in which said leg members are pivotally connected to the leg portions of the frame.

3. The fishing pole rack of claim 1 in which said leg members have means limiting the extent of their pivoting away from said frame.

4. The fishing pole rack of claim 1 in which said leg members are pivotally mounted to said leg portions inside of the U-shaped frame to improve compactness and storability of the rack.

5. The fishing pole rack of claim 1 in which said leg members have a cross-member joining one to the other.

6. The fishing pole rack of claim 1 in which said supports are U-shaped and fixed to a side of said bight portion 10, the frame on which said cross-bar joins the leg portions. 70

* * * * *

UNITED STATES PATENT OFFICE
CERTIFICATE OF CORRECTION

Patent No. 3,701,504   Dated October 31, 1972

Inventor(s) VIRGLE L. WOODS ET AL

It is certified that error appears in the above-identified patent and that said Letters Patent are hereby corrected as shown below:

Column 1, change the first paragraph, beginning at line 6, to read -- The present invention relates to a rack or holder for simultaneously supporting a number of fishing poles or rods, for example, of the reel type. --; line 10, "improvements" should read -- fishing --; line 20, "patent" should read -- must --; line 21, delete "interlock profiled"; line 22, "easi;y" should read -- easily --; line 37, "wiggle" should read -- wriggle --; lines 41 and 42, "respectively of control pusher, fishing assembly of these in parts" to read -- in order to control the fishing rod manually. Indeed, in some --; line 52, delete "pusher, especially their"; line 59, "light" should read -- bight --; line 60, second occurrence, "the" should read -- for --. Column 2, line 8 "section" should read -- a --; line 12, "1," should read -- left --; line 15, delete "or"; line 17, delete "strips extrusion."; line 51, "10," should read -- their --. Column 3, line 1, "clamping" should read -- 2, --; line 10, "complementary" should read -- the --; line 12, delete "walls"; line 14, " "engaged " to -- "plastic" --; line 20, after "polystyrene" change the comma (,) to a semicolon (;); lines 29 and 30, "constituted" should read -- be --; line 33, "walls" should read -- by --; line 35, "elements," should read -- away --; line 36, "median" should read -- the --; line 38, "10," should read -- the --; line 40, "10," should read -- of --; line 41, "with the" should read -- having --; "retreat" should read -- 28 --; line 45, delete "the slider,"; lines 49 and 50, "members 29," should read -- the band --; line 51, "10," should read -- movement --; line 52, "19," should read -- other --; "10," should read -- occurs --. Column 4, line 17, "29," should read -- fishing --; line 55, "10," should read -- of --; line 56, after "portions." delete "70".

Signed and sealed this 8th day of May 1973.

(SEAL)
Attest:

EDWARD M. FLETCHER, JR.
Attesting Officer

ROBERT GOTTSCHALK
Commissioner of Patents